(12) United States Patent
Vanlandingham

(10) Patent No.: US 9,205,965 B2
(45) Date of Patent: Dec. 8, 2015

(54) UNDERGARMENT WITH POWDER DISPENSING POUCHES

(76) Inventor: Susan Michelle Vanlandingham, Leawood, KS (US)

( * ) Notice: Subject to any disclaimer, the term of this patent is extended or adjusted under 35 U.S.C. 154(b) by 741 days.

(21) Appl. No.: 13/361,172

(22) Filed: Jan. 30, 2012

(65) Prior Publication Data

US 2012/0124712 A1 May 24, 2012

(51) Int. Cl.
*B65D 75/00* (2006.01)
*B65D 75/56* (2006.01)
*B65D 75/58* (2006.01)
*A41B 9/02* (2006.01)
*A41B 9/04* (2006.01)

(52) U.S. Cl.
CPC .............. *B65D 75/008* (2013.01); *B65D 75/56* (2013.01); *B65D 75/5883* (2013.01); *A41B 9/02* (2013.01); *A41B 9/023* (2013.01); *A41B 9/04* (2013.01); *Y02W 30/807* (2015.05)

(58) Field of Classification Search
CPC ............. A41B 9/02; A41B 9/023; A41B 9/04
USPC ............ 2/67, 227, 228, 82, 78.1, 87, 97, 230, 2/400, 403, 404, 406, 407
See application file for complete search history.

(56) References Cited

U.S. PATENT DOCUMENTS

| 2,145,688 | A | * | 1/1939 | Flamberg | 2/401 |
|---|---|---|---|---|---|
| 2,190,425 | A | * | 2/1940 | Hurd | 2/401 |
| 2,255,931 | A | * | 9/1941 | Kloster | 2/404 |
| D135,440 | S | * | 4/1943 | Scriggins | D2/704 |
| 2,316,588 | A | | 4/1943 | Isaacs | |
| 2,323,451 | A | * | 7/1943 | Bullinger | 128/891 |
| 2,344,374 | A | * | 3/1944 | Stephens | 450/104 |
| 2,356,696 | A | * | 8/1944 | Reis | 2/404 |
| 2,459,043 | A | * | 1/1949 | Owenby et al. | 2/401 |
| 2,465,913 | A | * | 3/1949 | Murdock | 450/104 |
| 2,486,499 | A | * | 11/1949 | Schoendorf | 2/404 |
| 2,491,250 | A | * | 12/1949 | Chatfield | 602/67 |
| 2,601,602 | A | * | 6/1952 | Firsching, Sr. | 602/67 |
| 2,641,257 | A | * | 6/1953 | Rutledge | 602/67 |
| 2,729,821 | A | * | 1/1956 | Freudenberg | 450/104 |
| 2,969,068 | A | * | 1/1961 | Murdock | 450/100 |
| 3,246,341 | A | * | 4/1966 | Paolucci | 2/404 |
| 3,486,507 | A | * | 12/1969 | Arnold et al. | 450/104 |
| 3,490,075 | A | * | 1/1970 | Abbott | 2/406 |

(Continued)

OTHER PUBLICATIONS

Dry Dudz, available at http://www.drydudz.com/our-story.html (last visited Mar. 27, 2012).

*Primary Examiner* — Danny Worrell
*Assistant Examiner* — Khaled Annis
(74) *Attorney, Agent, or Firm* — Armstrong Teasdale LLP

(57) ABSTRACT

A clothing ensemble for use in water includes a swimsuit and an undergarment that is independent from the swimsuit and that is worn at least partially beneath the swimsuit. The undergarment includes at least a pair of leg panels and a center panel that extends between the pair of leg panels. The leg panels are coupled to the center panel only by a forward seam and a rear seam that each extend from an inner portion of a wearer's first thigh to an inner portion of the wearer's second thigh. The center panel includes at least one pouch formed therein that is configured to dispense powder towards the wearer. The undergarment is fabricated from a non-rubberized material woven that induces tension to the wearer and that enables the undergarment to conform to the wearer. The pair of leg panels each include a leg band.

12 Claims, 3 Drawing Sheets

(56) References Cited

U.S. PATENT DOCUMENTS

| | | | |
|---|---|---|---|
| 3,844,282 A * | 10/1974 | King | 602/67 |
| 4,449,254 A * | 5/1984 | Fogg | 2/407 |
| 4,538,615 A * | 9/1985 | Pundyk | 450/131 |
| 4,977,626 A * | 12/1990 | Smith | 2/250 |
| 5,379,462 A | 1/1995 | Morgan et al. | |
| 6,161,222 A | 12/2000 | Strickland et al. | |
| 6,199,215 B1 | 3/2001 | Biggerstaff | |
| 6,287,169 B1 * | 9/2001 | Willms et al. | 450/101 |
| 6,409,712 B1 | 6/2002 | Dutari | |
| 6,662,378 B2 | 12/2003 | Vartanyan | |
| 6,789,270 B1 | 9/2004 | Pedrick | |
| 7,533,423 B2 | 5/2009 | Rudolph | |
| 7,757,307 B2 | 7/2010 | Wong | |
| 7,849,518 B2 | 12/2010 | Moore et al. | |
| 8,332,968 B1 * | 12/2012 | Williams | 2/405 |
| 8,458,819 B1 * | 6/2013 | Hoole | 2/403 |
| 2003/0135907 A1 | 7/2003 | Sanchez et al. | |
| 2003/0208829 A1 | 11/2003 | Ragot et al. | |
| 2004/0082927 A1 | 4/2004 | Littleton et al. | |
| 2004/0083538 A1 * | 5/2004 | Thomas | 2/400 |
| 2004/0154078 A1 * | 8/2004 | Auger | 2/400 |
| 2006/0230488 A1 | 10/2006 | Rudolph | |
| 2007/0079427 A1 * | 4/2007 | Herbert et al. | 2/403 |
| 2008/0229487 A1 * | 9/2008 | Kweon | 2/405 |
| 2008/0263742 A1 | 10/2008 | Vaughn | |
| 2009/0053274 A1 * | 2/2009 | Thomson | 424/402 |
| 2009/0300826 A1 * | 12/2009 | Harimoto | 2/403 |
| 2010/0125926 A1 | 5/2010 | Simonetti et al. | |
| 2010/0229284 A1 | 9/2010 | Wilson, II | |
| 2011/0307996 A1 * | 12/2011 | Radford et al. | 2/404 |

* cited by examiner

UNDERGARMENT WITH POWDER DISPENSING POUCHES

BACKGROUND OF THE INVENTION

The present invention relates generally to undergarments, and more particularly, to an undergarment designed to be worn at least partially underneath any type of pants or shorts worn in water, including, but not limited to, swimsuits, wet suits, and surf shorts.

At least some people participating in any water activity, such as swimming, water skiing, or surfing, prefer to wear loose swimwear, such as a board-short style suit, that is loose enough not to inhibit their movement, while still providing privacy, and that remains secured to their body once wet and while they are participating in the water activity. Accordingly, at least some known swimwear includes a drawstring that enables the wearer to tightly secure the swimwear about their waist. However, once wet, such swimwear often stretches or sags from the increased weight of the water, and/or the drawstrings may loosen and/or stretch when wet and allow the swimsuit to slip from the wearer's waist. In particular, when a wearer exits water, such as climbing into a boat, or climbing from a pool, the combination of the tendency of known swimwear to stretch when wet and the increased weight of the wet swimwear may increase the likelihood that their swimsuit will undesirably slip from the their waist.

Other known swimwear often also includes a liner that is attached within the swimwear. Such liners are commonly fabricated from a mesh material that is designed to provide support to the wearer, while being able to dry more quickly than the material of the outer swimwear. To facilitate providing support to the wearer, often such liners include a pair of elastic strips that each encircles the wearer's legs to ensure that the liner remains in position despite movement of the wearer and the outer portion of the swimwear. However, overtime, the elastic portions of such liners often stretch or lose their elasticity which may cause the rest of the liner to bunch up or accumulate uncomfortably within the wearer's groin region. Moreover, overtime such liners may chafe the wearer and/or offer limited or compromised support.

Because of the issues that such liners have, often such liners are cut from the swimwear by the user. To facilitate preventing swimwear malfunctions from leading to potentially embarrassing body exposures, and to provide comfort from stiff waistbands and hook and loop type fly fasteners that are common in board shorts, at least some wearers wear conventional underwear, such as briefs, boxers, boxer-briefs, and/or bicycle/compression-type shorts under their swimwear. However, conventional underwear is not designed to be worn wet, as it is made of mostly cotton, is not tailored to fit close to the body, and thus it is common for it to stretch and bunch when wet and sag and become stiff and scratchy once dried. Similarly, bicycle shorts are also not intended to be worn wet, are often as slow-drying as conventional underwear, which may contribute to chaffing, and/or are often expensive. In addition, bicycle/compression shorts, through their design, often provide more compression throughout the entire shorts than is desired by the user and become uncomfortable after a long period of time. Moreover, because such shorts are designed to warm specific body portions of the wearer, such shorts may be uncomfortable in hot environments, such as near a pool or at the beach.

Accordingly, a need exists for an improved swimwear/liner undergarment that provides protection, privacy and support, dries as quickly as outer swimwear, remains securely and comfortably positioned relative to the wearer, and that resists chaffing the user, that resists bunching on the user, and that may be comfortably worn for extended periods of time, before, during, and after water activities.

BRIEF DESCRIPTION OF THE INVENTION

In one embodiment, a clothing ensemble for use in water is provided. The clothing ensemble includes a swimsuit and an undergarment that is independent from, and is not coupled to, the swimsuit and that is configured to be worn at least partially beneath the swimsuit. The undergarment includes at least a pair of leg panels and a center panel extending between the pair of leg panels. The leg panels are coupled to the center panel only by a forward seam and a rear seam that each extend from an inner portion of a wearer's first thigh to an inner portion of the wearer's second thigh. The center panel includes at least one pouch formed therein of at least one layer of porous material. The at least one pouch is configured to dispense powder towards the wearer. The undergarment is fabricated from a non-rubberized material woven that induces tension to the wearer and that enables the undergarment to conform to the wearer. The pair of leg panels each include a leg band that prevents the undergarment leg panels from slipping towards a waist of the wearer.

In another embodiment, an undergarment for use beneath a shorts-type swimsuit is provided. The undergarment includes a pair of leg panels, a center panel, a support panel, and a waistband. The pair of each extend from an upper edge of the undergarment to a lower edge of the undergarment. The center panel extends between the pair of leg panels. The support panel extends between the pair of leg panels. The support panel extends from the center panel to the waistband, and the pair of leg panels are each coupled to the center panel only by a forward seam and a rear seam that are each oriented to extend from an inner portion of a wearer's first thigh to an inner portion of the wearer's second thigh. The center panel includes at least one pouch formed therein of at least one layer of porous material. The at least one pouch is configured to dispense powder towards the wearer. The undergarment is fabricated from a non-rubberized material woven in a pattern that induces tension to the wearer such that the undergarment substantially conforms to the wearer. Each of the pairs of leg panels each include a leg band that prevents the undergarment leg panels from slipping towards a waist of the wearer. The upper edge of the undergarment is folded against a portion of each of the respective leg panels and the support panel to form the waistband. The waistband is formed with a first weave pattern and each of the leg panels and the support panel is formed from a second weave pattern that extends at least between the waistband and each of the leg bands. The first weave pattern is configured to induce more tension to the wearer than the second weave pattern.

In yet another embodiment, an undergarment for use beneath a shorts-type swimsuit is provided. The undergarment includes a waistband, a pair of leg panels, a center panel, and a support panel. The waistband includes a first weave pattern. Each of the leg panels extends from the waistband to a lower edge of the undergarment, and each includes a second weave pattern that is different than the first weave pattern. The center panel extends between the pair of leg panels. The support panel extends between the pair of leg panels and from the center panel to the waistband. The leg panels are each coupled to the center panel only by a pair of substantially parallel seams that are each oriented to extend arcuately from an inner portion of a wearer's first thigh to an inner portion of the wearer's second thigh. The support panel includes at least one pouch formed therein of at least one layer of porous material. The undergarment is fabricated from a non-rubberized material that facilitates the undergarment substantially conforming to the wearer. Each of the leg panels cooperate to form at least one leg band that prevents the undergarment leg panels from slipping towards a waist of the wearer. The first weave pattern induces more tension to the wearer than the second weave pattern.

DETAILED DESCRIPTION OF THE INVENTION

Figure 1:
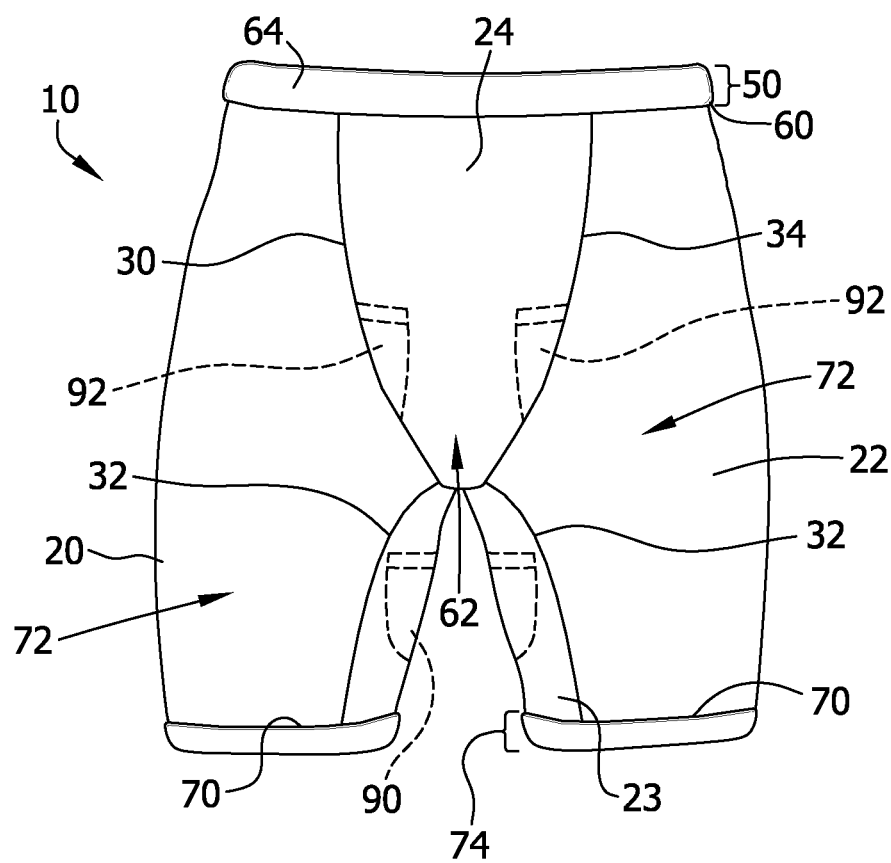
FIG. 1 is a front view of an exemplary undergarment to be worn at least partially under swimwear.
Figure 2:
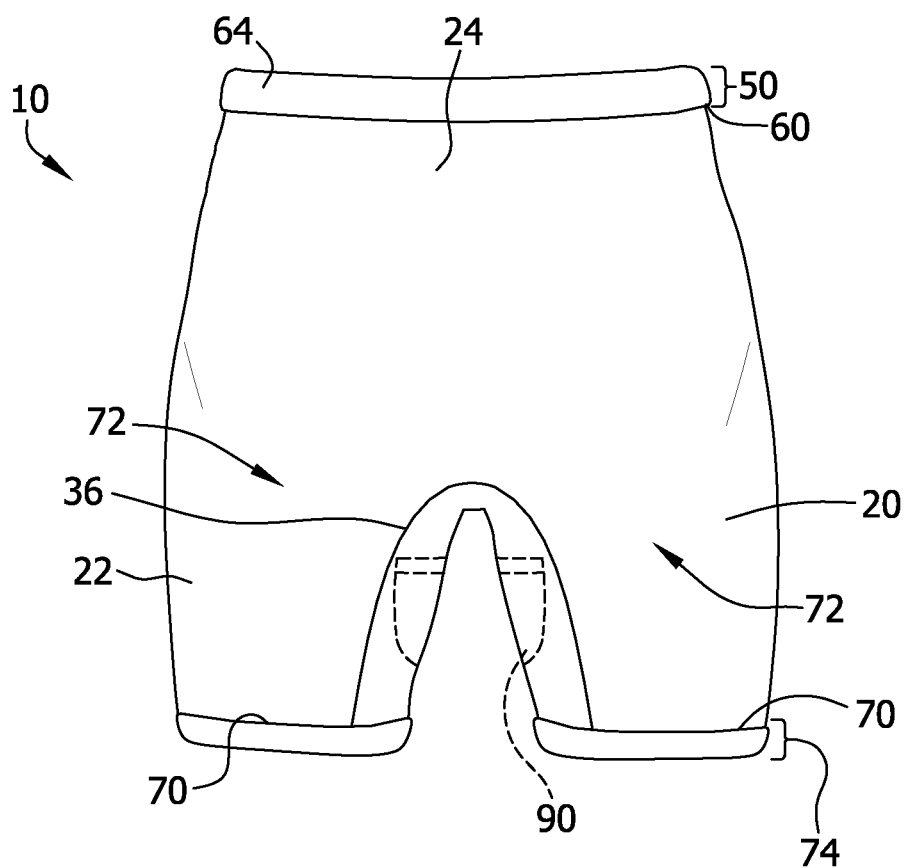
FIG. 2 is a rear view of the undergarment shown in FIG. 1.
Figure 3:
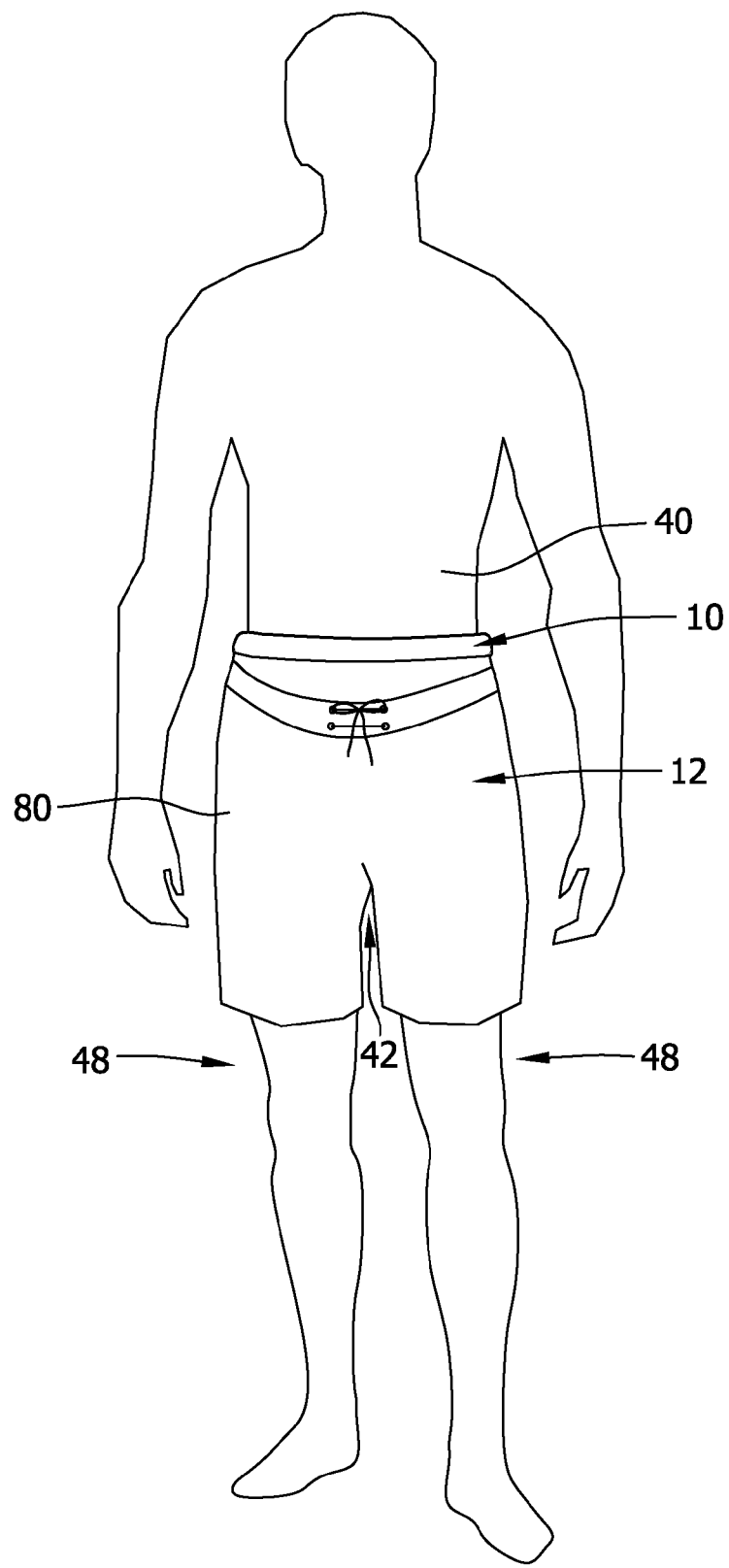
FIG. 3 is a front view of the undergarment shown in FIG. 1 and worn under an individual's swimwear.

FIG. 1 is a front view of an exemplary undergarment 10 designed to be worn at least partially under swimwear 12 (shown in FIG. 3) and that may function as an improved swimwear liner. FIG. 2 is a rear view of undergarment 10. FIG. 3 is a front view of undergarment 10 as worn under an individual's swimwear 12. In the exemplary embodiment, undergarment 10 includes a right leg fabric panel 20, a left leg fabric panel 22, a center panel 23, and a crotch support panel 24. Panels 20 and 22 are coupled together such that panel 24 and panel 23 each extend between panels 20 and 22. More specifically, in the exemplary embodiment, panel 20 is coupled along a right support seam 30 to support panel 24, and similarly, panel 22 is coupled along a left support seam 34 to support panel 24. In the exemplary embodiment, panel 23 is substantially rectangular and panels 20 and 24 are also coupled to panel 23 along a front seam 32 and along a rear seam 36. In other embodiments, panels 20, 22, 23, and 24 may have any shape that enables undergarment 10 to function as described herein. In the exemplary embodiment, when undergarment 10 is worn, seams 32 and 36 are positioned in areas that facilitate reducing friction experienced by the wearer 40 by seams. Moreover, the location of seams 32 and 36 enables undergarment 10 to adequately stretch during wear. Alternatively, other fabrication assemblies are possible without deviating from the intent of the patent. For example, in other embodiments, undergarment 10 may also include a front panel that is coupled to a rear or groin panel through a separate center support panel. In yet other embodiments, undergarment 10 may include only a front panel and a rear panel, or may include additional panels.

The orientation of panels 20, 22, and 24 enables support panel 24 to provide enhanced support to a wearer's groin region 42. More specifically, in the exemplary embodiment, panels 20 and 22 each include a portion that extends between the wearer's legs 48, and support panel 24 is shaped to generally follow the natural contours of the wearer's groin region 42. Moreover, in the exemplary embodiment, the combination of the shape of center panel 23, and the orientation of panels 20 and 22 relative to center panel 23, also facilitates panel 23 providing additional support to the wearer's groin region 42. In some embodiments, panel 23 is also shaped to follow the contours of the wearer's buttocks regions.

Alternatively, other fabrication assemblies are possible without deviating from the intent of the patent. For example, in other embodiments, undergarment 10 may include a front panel that is coupled to a rear panel and to a separate center support panel. In such an embodiment, the front panel may be coupled to the rear panel along a pair of outer seams that extend longitudinally along a pair of radially inner seams that extend longitudinally along the wearer's inner thighs in front and rear of groin area, and each of the front and rear panels is also coupled to the center panel such that the center panel forms the crotch region of undergarment 10. In yet other embodiments, undergarment 10 may include only a front panel and a rear panel, or may include additional fabric panels.

In each embodiment, undergarment 10 is fabricated with a minimal amount of seams, such as seams 30, 32, 34, and 36. Moreover, each seam 30, 32, 34, and 36 is formed with a flatlock/flat-seam construction that facilitates reducing chafing and abrasion to a wearer 40 while enhancing the comfort to the wearer 40. Furthermore, in each embodiment, undergarment seams 30, 32, 34, and 36 are formed from stitching materials and a weave technique that enables undergarment 10 and seams 30, 32, 34, and 36 to remain highly flexible over time while remaining durable and to resist stretching out, wherein undergarment 10 does not return to its original shape after being stretched.

In the exemplary embodiment, undergarment 10 is formed with a waistband region 50 that circumscribes the wearer 40. More specifically, in the exemplary embodiment, panels 20, 22, and 24 are coupled together such that an upper end 60 of undergarment 10 is tapered slightly inwardly such that a circumference defined at upper end 60 is at least slightly smaller than any other circumference defined between upper end 60 and a crotch area 62 of undergarment 10. Moreover, in the exemplary embodiment, a waistband 64 is formed within region 50 as upper end 60 is folded downward and coupled to undergarment 10. More specifically, in the exemplary embodiment, within waistband region 50, the material is knitted in one direction, i.e., width wise about undergarment 10, that facilitates waistband 64 stretching more about the wearer 40, i.e., about their waist, than towards crotch area 62. As such, in the exemplary embodiment, undergarment 10 squeezes against, i.e., induces tension towards, wearer 40 at least slightly more about waistband 64 than in other areas of undergarment 10 between waistband 64 and crotch area 62, without the need for elastic or rubberized materials, a tightening string, and/or any other known adjustment systems.

Similarly, in the exemplary embodiment, within undergarment 10, a lower end 70 of each defined leg portion 72 is tapered inwardly such that a circumference defined at each leg portion lower end 70 is at least slightly smaller than any other circumference defined within each leg portion 72. Moreover, in the exemplary embodiment, each leg portion 72 is formed with a leg band 74 that is formed as lower end 70 is folded upwardly towards crotch area 62 and is coupled to undergarment 10. As such, in the exemplary embodiment, undergarment 10 squeezes against wearer 40 at least slightly more along leg bands 74 than in other areas of leg portions 72 without the need for elastic or rubberized materials, a tightening string, and/or any other known adjustment systems.

In the exemplary embodiment, undergarment 10 is formed from a high-performance fabric that enables undergarment 10 to cover the body of wearer 40 from their waist to their thighs. Moreover, in the exemplary embodiment, the fabric used in fabricating undergarment 10 also enables undergarment 10 to tightly conform to the wearer's body without compressing wearer 40. The fabric is highly flexible and durable, and is woven with a synthetic fiber, close weave technique. More specifically, in the exemplary embodiment, undergarment 10 includes pure elastane threads that are weaved into other fabric to enable undergarment 10 to tightly conform to the wearer's body without compression and without including rubberized materials, polypropylene materials, or any other material that induces compression to the wearer. Moreover, in the exemplary embodiment, undergarment 10 is fabricated from the same material throughout. In alternative embodiments, either waistband region 50 and/or leg bands 74 may be fabricated from a different material and/or with a different weave pattern than the remainder of undergarment 10.

Waistband region 50 and leg bands 74, in combination with the material used in fabricating undergarment 10 facilitates maintaining undergarment in position relative to wearer 40 without undergarment 10 undesirably slipping downwardly from the wearer's waist and without undergarment 10 bunching and/or ballooning up as a result of leg portions 72 riding upwardly towards the wearer's waist. Moreover, waistband region 50 and leg bands 74 also facilitate reducing irritants, such as sand and/or debris, from entering undergarment 10. As such, skin irritations, infections, rashes, and discomfort for the wearer are facilitated to be reduced.

More specifically, in the exemplary embodiment, undergarment 10 is fabricated from a high-performance material, such as a synthetic and/or cotton/polyester/spandex-type material combination, that is assembled in a tight or close weave pattern that includes the combination of cotton, polyester, and elastane fibers. Moreover, in some embodiments, other elastic-like fibers, such as spandex, may also be used in fabricating undergarment 10. For example, in one embodiment, undergarment is fabricated at least partially with polyurethaneurea material combination that facilitates increasing the resistance of the material to the potential damaging effects of chlorine or salt-water. In each embodiment, the weave pattern used in assembling undergarment 10 induces a sufficient tension to the wearer 40 such that no rubberized, elastic, and/or neoprene materials, or combinations thereof, are necessary for use in fabricating undergarment 10. Moreover, the combination of the materials used and the tight weave pattern enables undergarment 10 to conform tightly to the wearer's body, while remaining comfortable to the wearer, and while providing a garment that is more tear resistant, that weighs less, and that returns to its original shape after being repeatedly stretched, as compared to known suits/shorts that rubberized materials. The degree of tension induced to the wearer 40, i.e., a degree of elasticity of the material, can be adjusted by selecting different materials, different quantities of materials (i.e., vary the amount of elastane fiber included in the weave), and/or different weave patterns within undergarment 10. Similarly, different weave patterns may be selected to enable undergarment 10 to induce different degrees of tension within different portions of undergarment 10. Furthermore, in each embodiment, the weave pattern selected for use with undergarment 10 provides an inner surface that is comfortable to, and that facilitates preventing chaffing the wearer 40 and facilitates the garment returning to its original shape after stress.

Moreover, in at least some embodiments, undergarment 10 is also fabricated with a wicking technology that facilitates pulling moisture away from the wearer's body via a capillary action that moves water away from wearer's skin towards an outer surface of undergarment 10 to facilitate rapid evaporation. In some embodiments, waistband 64 and/or leg portions 72 may be formed from a different material than the material used in fabricating the remainder of undergarment 10. In other embodiments, waistband 64 and/or leg portions 72 may be formed with a different, i.e., a looser, weave pattern than the weave pattern used in fabricating the remainder of undergarment 10.

Undergarment 10 may be formed from a variety of different non-compression materials that do not contain rubberized or polychloroprene/neoprene materials that can irritate individuals with sensitive skin or latex allergies. In each embodiment, the material used in fabricating undergarment 10 is formed in a tightly woven pattern that induces tension to the wearer 40 and that enables undergarment 10 to fit snugly and conform to the wearer 40, without inducing a uniform compression to the wearer's body as is commonly induced by conventional bicycle shorts, for example. In addition to moisture wicking capabilities, the weave pattern also provides improved ventilation\breathability to the wearer 40. The life of undergarment 10 is also facilitated to be improved as the material blend used in fabricating undergarment 10 resists body oils, resists tearing, and resists fading.

When worn in combination, as intended, beneath a board shorts-style or Bermuda-style swimsuit 80, the snug fit and tight conformance of undergarment 10 against the wearer 40, enables the undergarment to be covered and concealed from view, if desired or the patterned waistband can complement the swimsuit 80 and extend above the wearers waist-line. More specifically, the design of undergarment 10 is such that when worn beneath a conventional swimsuit 80, swimsuit 80 does not appear layered or bulky. Moreover, because undergarment 10 is not interconnected in any way to swimsuit 80, swimsuit 80 may be substantially free-moving relative to undergarment 10 and may be worn at any relative location relative to the wearer's waist independently from undergarment 10. As such, regardless of the water activity, if swimsuit 80 stretches or sags from the increased weight of being wet, undergarment 10 provides privacy to the wearer 40 without inhibiting their movement.

In the exemplary embodiment, undergarment 10 also includes a pair of inner thigh pouches 90 and at least one center pouch 92. More specifically, in the exemplary embodiment, pouches 90 are formed in panel 23. Alternatively, undergarment 10 may not include pouches 90 and/or 92. Pouches 90 and 92 may be fabricated from the same materials used in fabricating undergarment 10 or alternatively, pouches 90 and 92 may be fabricated from different materials than is used in fabricating undergarment 10. In the exemplary embodiment, each pouch 90 and 92 is formed from at least an inner layer (not shown) of a polyester material that includes no more than about 10% spandex and no more than about 93% polyester. In one embodiment, each pouch 90 and 92 is fabricated with a jersey reactive print technique and/or is combined with an air hole mesh construction that produces a porous material and/or looser weave pattern. Moreover, in the exemplary embodiment, anti-bacterial and wicking treatments are added to each pouch 90 and 92. Pouches 90 and 92 are sized to receive a quantity of powder therein, such as an anti-itch powder, an anti-rash powder, an anti-chafing powder, and/or any other powder or combination of powders desired by the wearer 40. The inner layer of each pouch 90 and 92 is constructed/selected to facilitate a slow-release of the powder contained in pouch 90 and/or 92 towards the wearer's groin region.

The above-described undergarment provides a wearer with an improved swimsuit undergarment that resists bunching, that remains comfortably positioned relative to the wearer despite an outer swimsuit moving independently from it, and that provides privacy and support to the wearer without unnecessary compression to the wearer. The undergarment is fabricated in a weave pattern that facilitates quick-dry technology and breathability without the inclusion of an uncomfortable waistband or rubberized product. In one embodiment, the undergarment includes powder-dispensing pouches that are formed in inconspicuous locations of at least one layer of porous material and/or a looser weave pattern. The undergarment provides privacy to the wearer, without restricting movement of the wearer, in a cost-effective, fashionable, and reliable manner.

Exemplary embodiments of swimwear undergarments are described above in detail. Although the undergarments are herein described and illustrated in association with swimwear, it should be understood that the present invention may be used with other activities, such as beneath hockey pants, soccer shorts, or baseball pants, for example. Moreover, it should also be noted that the components of each undergarment described herein are not limited to the specific embodiments described herein, but rather, aspects of each undergarment embodiment and each fabrication method may be utilized independently and separately from other embodiments and methods described herein.

While the invention has been described in terms of various specific embodiments, those skilled in the art will recognize that the invention can be practiced with modification within the spirit and scope of the claims.

What is claimed is:

1. A clothing ensemble for use in water, said clothing ensemble comprising:
    a swimsuit; and
    an undergarment independent from said swimsuit and to be worn at least partially beneath said swimsuit, said undergarment comprising at least a pair of leg panels and a separate center panel extending between said pair of leg panels, said leg panels coupled to said center panel only by a forward seam and a rear seam that each extend from an inner portion of a wearer's first thigh to an inner portion of the wearer's second thigh, wherein said undergarment further comprises an upper edge comprising a waistband and a separate support panel that extends between said pair of leg panels, each of said leg panels coupled to said support panel via a seam extending from said forward seam towards said upper edge, said undergarment fabricated from a non-rubberized material woven to induce a controlled tension to the wearer such that said undergarment substantially conforms to the wearer, said pair of leg panels each comprise a leg band designed to prevent said undergarment leg panels from slipping towards a waist of the wearer;
    wherein said center panel comprises at least one center panel pouch at the inner portion of at least one of the wearer's thighs designed to contain a quantity of powder therein, wherein said at least one center panel pouch includes a porous inner layer designed for slow-release of powder contained in said at least one center panel pouch towards the wearer of said undergarment.

2. A clothing ensemble in accordance with claim 1 wherein said support panel comprises at least one support panel pouch designed to contain a quantity of powder therein, wherein said at least one support panel pouch includes a porous inner layer designed for slow-release of powder contained in said at least one support panel pouch towards the wearer of said undergarment.

3. A clothing ensemble in accordance with claim 1 wherein a lower edge of each of said leg panels is folded against a portion of each of said respective leg panels to form each said leg band, each said leg band inducing more tension to the wearer than a segment of said respective leg panel extending at least between said leg band and said center panel.

4. A clothing ensemble in accordance with claim 1 wherein an upper edge of each of said leg panels is folded against a portion of each of said respective leg panels to form said waistband, said waistband inducing more tension to the wearer than a segment of each of said leg panels extending at least between said waistband and each of said leg bands.

5. A clothing ensemble in accordance with claim 1 wherein said undergarment material reduces irritation induced to the wearer from said undergarment, said undergarment material comprising properties that wick moisture away from the wearer towards an outer surface of said undergarment.

6. An undergarment for use beneath a shorts-type swimsuit, said undergarment comprising:
    an upper edge comprising a waistband;
    a lower edge;
    a pair of leg panels each extending from said upper edge of said undergarment to said lower edge of said undergarment;
    a separate center panel extending between said pair of leg panels;
    a separate support panel extending between said pair of leg panels; and
    a waistband, said support panel extending from said center panel to said waistband, said pair of leg panels each coupled to said center panel only by a forward seam and a rear seam that are each oriented to extend from an inner portion of a wearer's first thigh to an inner portion of the wearer's second thigh, wherein each of said leg panels is coupled to said support panel via a seam extending from said forward seam towards said upper edge, said undergarment fabricated from a non-rubberized material woven in a pattern that induces tension to the wearer such that said undergarment substantially conforms to the wearer, each of said leg panels comprises a leg band designed to prevent said undergarment leg panels from slipping towards a waist of the wearer, said upper edge of said undergarment is folded against a portion of each of said respective leg panels and said support panel to form said waistband, said waistband induces more tension to the wearer than a segment of said support panel and a segment of each of said leg panels extending at least between said waistband and each of said leg bands, said center panel and said support panel comprising at least one pouch designed to contain a quantity of powder therein, wherein said at least one pouch comprises a center panel pouch adapted to be located at the inner portion of one of the wearer's thighs and wherein said at least one pouch includes a porous inner layer designed for slow-release of powder contained in said at least one pouch towards the wearer of said undergarment.

7. An undergarment in accordance with claim 6 wherein said center panel is substantially rectangular.

8. An undergarment in accordance with claim 6 wherein said lower edge of said undergarment is folded against a portion of each of said respective leg panels to form each said leg band, each of said leg bands inducing more tension to the wearer than said segment of said support panel and said segment of each of said leg panels extending at least between said waistband and each of said leg bands.

9. A undergarment in accordance with claim 6 wherein said undergarment material reduces irritation induced to the wearer from said undergarment, said undergarment material comprising properties that wick moisture away from the wearer towards an outer surface of said undergarment.

10. An undergarment for use beneath a shorts-type swimsuit, said undergarment comprising:
    an upper edge comprising a waistband;
    a lower edge;
    a pair of leg panels each extending from said waistband to said lower edge of said undergarment;

a separate center panel extending between said pair of leg panels; and a separate support panel extending between said pair of leg panels from said center panel to said waistband, said pair of leg panels each coupled to said center panel only by a pair of substantially parallel seams that are each oriented to extend arcuately from an inner portion of a wearer's first thigh to an inner portion of the wearer's second thigh, said center panel comprising at least one pouch designed to contain a quantity of powder therein, wherein said at least one center panel pouch is adapted to be located at the inner portion of at least one of the wearer's thighs and wherein said at least one center panel pouch includes a porous inner layer designed for slow-release of powder contained in said at least one center panel pouch towards the wearer of said undergarment, said undergarment fabricated from a non-rubberized material that substantially conforms said undergarment to the wearer, said pair of leg panels cooperate to form at least one leg band designed to prevent said undergarment leg panels from slipping towards a waist of the wearer, said waistband induces more tension than said leg panels to the wearer.

11. An undergarment in accordance with claim 10 wherein said undergarment material comprises properties that wick moisture away from the wearer towards an outer surface of said undergarment.

12. An undergarment in accordance with claim 10 wherein said waistband retains said undergarment in position relative to said wearer without the use of a fastener mechanism.

\* \* \* \* \*